US008678784B2

(12) United States Patent
Atarashi et al.

(10) Patent No.: US 8,678,784 B2
(45) Date of Patent: Mar. 25, 2014

(54) DRIVE DEVICE

(75) Inventors: Tomoo Atarashi, Kariya (JP); Natsuki Sada, Anjo (JP); Takuya Komatsu, Anjo (JP); Yutaka Ozeki, Susono (JP)

(73) Assignee: Aisin AW Co., Ltd., Anjo (JP)

( * ) Notice: Subject to any disclaimer, the term of this patent is extended or adjusted under 35 U.S.C. 154(b) by 711 days.

(21) Appl. No.: 12/879,043

(22) Filed: Sep. 10, 2010

(65) Prior Publication Data
US 2011/0076165 A1 Mar. 31, 2011

(30) Foreign Application Priority Data

Sep. 25, 2009 (JP) ................. 2009-221323

(51) Int. Cl.
*F04B 17/00* (2006.01)
*F04B 35/00* (2006.01)
*F04B 39/06* (2006.01)
*F04B 39/02* (2006.01)

(52) U.S. Cl.
USPC ........................................ 417/372

(58) Field of Classification Search
USPC ............ 417/349, 364, 368, 369, 372, 423.11, 417/423.14, 410.4; 123/198 C; 418/27.1, 31
See application file for complete search history.

(56) References Cited

U.S. PATENT DOCUMENTS

| | | | | |
|---|---|---|---|---|
| 4,334,836 A * | 6/1982 | Kubis et al. | ................... | 417/364 |
| 4,359,909 A | 11/1982 | Sogo | | |
| 4,441,866 A * | 4/1984 | Kubis et al. | ................... | 417/364 |
| 4,473,300 A | 9/1984 | Goins | | |
| 7,651,425 B2 * | 1/2010 | Shimizu | ........................... | 475/5 |
| 2008/0261740 A1 * | 10/2008 | Shimizu | ........................... | 475/5 |

FOREIGN PATENT DOCUMENTS

| | | |
|---|---|---|
| JP | A-51-1862 | 1/1976 |
| JP | U-56-146159 | 11/1981 |
| JP | B2-62-047576 | 10/1987 |
| JP | A-4-203556 | 7/1992 |
| JP | A-4-266652 | 9/1992 |
| JP | A-2001-227625 | 8/2001 |
| JP | 2002054728 A * | 2/2002 |
| JP | A-2002-054728 | 2/2002 |
| JP | 2008-265517 | 11/2008 |
| JP | A-2009-124822 | 6/2009 |

OTHER PUBLICATIONS

JP 2002054728 Abstract;Feb. 2002;Kamiya et al.*
May 31, 2012 Partial Translation of Notification of Reason(s) for Refusal issued in Japanese Patent Application No. 2010-189888.
Nov. 2, 2010 International Search Report issued in PCT/JP2010/063531 (with translation).

* cited by examiner

*Primary Examiner* — Charles Freay
*Assistant Examiner* — Amene Bayou
(74) *Attorney, Agent, or Firm* — Oliff PLC

(57) ABSTRACT

A drive device in which a driving force transfer mechanism is accommodated in a case that includes a main body portion having an opening portion and a cover portion attached to the opening portion, and the cover portion is provided with an oil pump. The drive device is configured with a pump cover attached to a case inner surface of the cover portion, which forms an inner surface of the case, such that the pump cover is accommodated in a case internal space surrounded by the main body portion and the cover portion. A pump chamber of the oil pump is formed by a recess that is formed in at least one of a mating surface of the cover portion and a mating surface of the pump cover in a bonding portion between the cover portion and the pump cover.

15 Claims, 4 Drawing Sheets

DRIVE DEVICE

INCORPORATION BY REFERENCE

The disclosure of Japanese Patent Application No. 2009-221323 filed on Sep. 25, 2009 including the specification, drawings and abstract is incorporated herein by reference in its entirety.

BACKGROUND OF THE INVENTION

The present invention relates to drive devices, in which a driving force transfer mechanism is accommodated in a case that includes a main body portion having an opening portion, and a cover portion attached to the opening portion, and which includes an oil pump in the cover portion.

DESCRIPTION OF THE RELATED ART

In order to supply oil for lubricating and cooling each part of a drive device, a mechanical oil pump is sometimes provided in a case of the drive device. The mechanical oil pump is operated by a rotational driving force of a rotating shaft (e.g., an input shaft to which a rotational driving force of an engine is transmitted) of a driving force transmission mechanism accommodated in the case. For example, Japanese Patent Application Publication No. JP-A-2008-265517 (such as Paragraph 0042 and FIG. 2) below discloses a structure in which an oil pump 70 is provided in a cover 12 that is attached to one end of a case 11 in a fluid-tight manner. More specifically, a pump chamber of the oil pump 70 is defined by the cover 12 and an oil pump cover 76 that is attached to the case outer surface of the cover 12.

SUMMARY OF THE INVENTION

However, in the structure of Japanese Patent Application Publication No. JP-A-2008-265517 (such as Paragraph 0042 and FIG. 2), the pump chamber of the oil pump is formed on the outer surface of the case that accommodates a driving force transfer mechanism (the case outer surface of the cover 12 in the example of Japanese Patent Application Publication No. JP-A-2008-265517 (such as Paragraph 0042 and FIG. 2). Thus, if there is a void in the bonding surface between members that define the pump chamber (the bonding surface between the cover 12 and the oil pump cover 76 in the example of Japanese Patent Application Publication No. JP-A-2008-265517 (such as Paragraph 0042 and FIG. 2), and oil can flow through the void, oil can leak out of the case through the void. In this structure, a high level of fluid-tightness is required for bonding of the members that define the pump chamber, thereby increasing the number of parts and complicating the manufacturing process, and thus increasing manufacturing cost.

Thus, it is desired to implement drive devices that reduce the level of fluid-tightness required for bonding between members that define a pump chamber.

A drive device according to a first aspect of the present invention in which a driving force transfer mechanism is accommodated in a case that includes a main body portion having an opening portion and a cover portion attached to the opening portion and, the cover portion is provided with an oil pump, has a characteristic structure in which the drive device includes a pump cover attached to a case inner surface of the cover portion, which forms an inner surface of the case, such that the pump cover is accommodated in a case internal space surrounded by the main body portion and the cover portion, and a pump chamber of the oil pump is formed by a recess that is formed in at least one of a mating surface of the cover portion and a mating surface of the pump cover in a bonding portion between the cover portion and the pump cover.

According to the first aspect, the pump chamber of the oil pump is formed so as to be accommodated in the case internal space surrounded by the main body portion and the cover portion. Thus, even if oil leaks out of the pump chamber through the bonding surface between the cover portion and the pump cover which define the pump chamber, the oil merely drops in the case internal space. Note that the driving force transfer mechanism, which is lubricated and cooled by oil, is accommodated in the case internal space. Thus, oil leakage into the case internal space is allowed. This can reduce the level of fluid-tightness that is required for bonding between the cover portion and the pump cover, thereby suppressing an increase in the number of parts, and reducing the complication of the manufacturing process. That is, the cover portion and the pump cover can be fixed together so as to be in contact with each other, without using any sealing member (such as an O-ring), and even if a sealing member is used, a simple seal structure can be used, whereby manufacturing cost can be reduced.

A part that forms, together with the pump cover, the pump chamber is the cover portion that is detachable from the main body portion of the case. This can simplify assembly and maintenance of the oil pump.

According to a second aspect of the present invention, at least one of a suction oil passage and a discharge oil passage of the oil pump may be formed by a recessed groove provided at least in one of the mating surface of the cover portion and the mating surface of the pump cover.

According to the second aspect, at least one of the suction oil passage and the discharge oil passage, which are essential oil passages for the oil pump, can be formed in a simple manner by using a recessed groove formed in at least one of the mating surface of the cover portion and the mating surface of the pump cover. This can reduce the complication of the manufacturing process, as compared to the case where the suction oil passage and the discharge oil passage are formed by drilling.

In order to suppress an increase in size of the case, it is preferable that a connecting oil passage that connects the suction oil passage to an oil supply source, and a connecting oil passage that connects the discharge oil passage to a member to which oil is supplied, be provided in the case. In this regard, the above structure can simplify the structure of a connection portion between the oil passage (one or both of the suction oil passage and the discharge oil passage) formed by the recessed groove provided in the mating surface, and the connecting oil passage. That is, the connection portion can be formed by merely using an end of the pump cover accommodated in the case internal space, as the connection portion, or by merely processing the pump cover in a simple manner. Note that since the pump cover accommodated in the case internal space is typically smaller than the cover member, it is extremely advantageous that the connection portion can be formed by processing the smaller part, namely the pump cover.

According to a third aspect of the present invention, the cover portion and the pump cover may contact each other on smooth contact surfaces respectively provided in the mating surface of the cover portion and the mating surface of the pump cover.

According to the third aspect, a certain level of fluid-tightness can be obtained by merely fixing the cover portion and the pump cover in contact with each other without using any sealing member. This eliminates the need for the sealing member, and also eliminates the need for a shaping process for holding the sealing member, whereby manufacturing cost can be reduced. Note that as described above, oil leakage into the case internal space is not problematic since such oil leakage is allowed.

According to a fourth aspect of the present invention, a relay oil passage, through which oil for either lubricating or cooling the driving force transfer mechanism or oil for both lubricating and cooling the driving force transfer mechanism flows, may be formed by a recess provided in at least one of the mating surface of the cover portion and the mating surface of the pump cover, and the pump cover may include a trough-shaped oil introducing portion for guiding oil, which is scooped up by rotation of a rotating member of the driving force transfer mechanism, to the relay oil passage.

According to the fourth aspect, the relay oil passage can be formed by a simple structure, thereby reducing the complication of the manufacturing process as compared to the case where the relay oil passage is formed by drilling.

Moreover, the oil pump introducing portion and the oil cover can be formed by the same part, thereby reducing an increase in the number of parts caused by providing the oil introducing portion.

According to a fifth aspect of the present invention, the drive device may further include a rotating shaft that forms the driving force transfer mechanism and is positioned coaxially with an oil pump drive shaft for driving the oil pump, and the rotating shaft be supported by the pump cover via a bearing.

According to the fifth aspect, the rotating shaft, which is positioned coaxially with the oil pump drive shaft, can be supported by the cover portion via the pump cover. Thus, the structure in which the pump cover is positioned between the rotating shaft and the cover portion can be easily implemented.

According to a sixth aspect of the present invention, a discharge chamber that communicates with a discharge port of the oil pump, an axial end chamber that communicates with an axial end of a central axis oil passage provided in the oil pump drive shaft for driving the oil pump, and a communicating oil passage that connects the discharge chamber to the axial end chamber, may be formed in the case inner surface of the cover portion.

According to the sixth aspect, since oil can be appropriately supplied to the central axis oil passage located in the oil pump drive shaft, the oil can be supplied from the central axis side to the parts that constitute the driving force transfer mechanism via the central axis oil passage. This structure is preferable in the case where there are parts to which oil cannot be easily supplied from outside in a radial direction determined based on the oil pump drive shaft.

According to a seventh aspect of the present invention, the oil pump may include a pump rotor in the pump chamber, the pump rotor may be positioned coaxially with an oil pump drive shaft, and be driven by the oil pump drive shaft, and at least one of the suction oil passage and the discharge oil passage may be formed along a radial direction of the pump rotor.

According to the seventh aspect, the suction oil passage and the discharge oil passage can be reduced in length in the case where oil is supplied to the pump chamber from radially outside the pump rotor, and in the case where oil is supplied from the pump chamber to radially outside the pump rotor.

According to an eighth aspect of the present invention, the oil pump generate an oil pressure required to either lubricate or cool the driving force transfer mechanism, or an oil pressure required to both lubricate and cool the driving force transfer mechanism.

The oil pressure that is required to lubricate and/or cool the driving force transfer mechanism is lower than that required to engage clutches and brakes in an automatic transmission. Thus, the level of fluid-tightness required for bonding between members that define the pump chamber is reduced in the structure in which the oil pump generates the oil pressure required to either lubricate or cool the driving force transfer mechanism, or the oil pressure required to both lubricate and cool the driving force transfer mechanism. The present invention is especially suitable for such a structure.

DETAILED DESCRIPTION OF THE EMBODIMENTS

Figure 1:
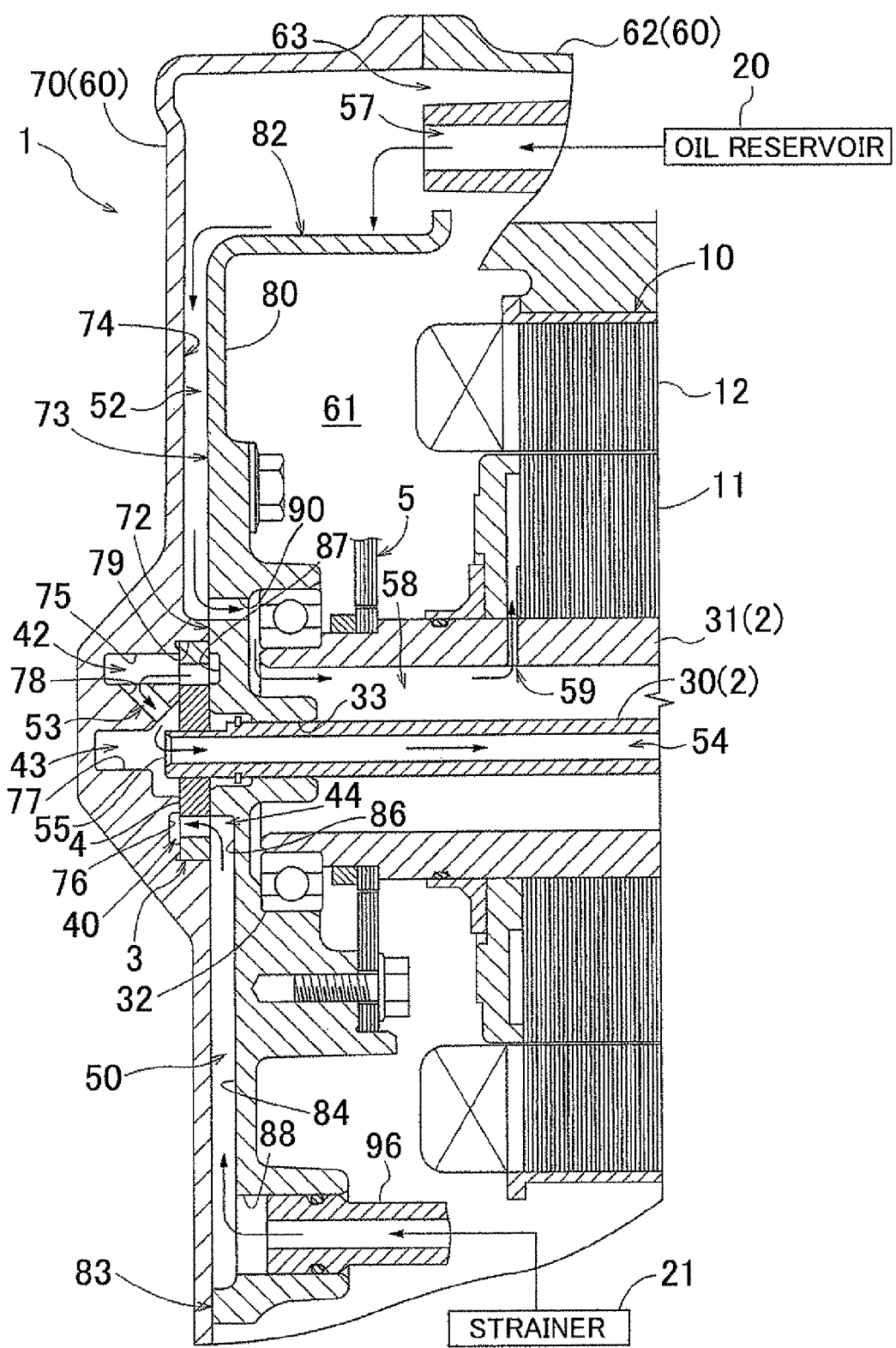
FIG. 1 is a partial axial cross-sectional view of a drive device according to an embodiment of the present invention.

An embodiment of the present invention will be described below with reference to the accompanying drawings, with respect to an example in which the present invention is applied to a drive device for hybrid vehicles. As shown in FIG. 1, a drive device 1 of the present embodiment has an oil pump 3 in a cover portion 70 of a case 60 for accommodating a driving force transfer mechanism 2. The drive device 1 is characterized in the structure of the oil pump 3 provided in the cover portion 70, and the structure of oil passages associated with the oil pump 3. The structure of the drive device 1 of the present embodiment will be sequentially described in detail below in the sections "Overall Structure of Drive Device," "Structure of Cover Portion," "Structure of Pump Cover," "Structure of Oil Pump," and "Structure of Oil Passages." Note that, in the following description, the "axial direction," the "circumferential direction," and the "radial direction" are defined based on the central axis of a pump rotor 4 of the oil pump 3, unless otherwise specified. In the following description, "one axial side" refers to the left side in FIG. 1, and the side located away from the viewer in the direction perpendicular to the plane of the paper in FIG. 2, unless otherwise specified. Moreover, in the following description, the "other axial side" refers to the right side in FIG. 1, and the side located closer to the viewer in the direction perpendicular to the plane of the paper in FIG. 2, unless otherwise specified.

1. Overall Structure of Drive Device

The overall structure of the drive device 1 will be described with reference to FIG. 1. In the present embodiment, the drive device 1 is a drive device for a hybrid vehicle (not shown), and includes an engine (not shown) and two rotating electrical machines 10, 13 as driving power sources. The term "engine" is herein used as a concept including various known internal combustion engines such as a spark ignition engine (a gasoline engine) and a compression ignition engine (a diesel engine). The term "rotating electrical machine" is herein used as a concept including a motor (an electric motor), a generator (an electric generator), and a motor generator that functions both as a motor and a generator as needed. FIG. 1 shows one of the two rotating electrical machines 10, 13, namely the rotating electrical machine 10. The drive device 1 includes the case 60 for accommodating the two rotating electrical machines 10, 13 and the driving force transfer mechanism 2 described below, and one end of the case 60 is fixedly connected to the engine. Torque of the engine (a rotation driving force) is transmitted to the driving force transfer mechanism 2 in the case 60. In this example, although not shown in the figure, the other axial end of the case 60, namely the right end of the case 60 in FIG. 1, is a fixedly connected portion that is fixedly connected to the engine.

The case 60 includes a main body portion 62 having an opening portion 63, and a cover portion 70 that is attached to the opening portion 63. In this example, the main body portion 62 and the cover portion 70 are bonded together in a fluid-tight state. Although not shown in the figure, the main body 62 has a cylindrical peripheral wall, which is structured so as to cover the rotating electrical machines 10, 13 and the driving force transfer mechanism 2 from radially outside. In this example, the cover portion 70 is structured so as to entirely cover and close the opening portion 63, and axially separates the space inside the case 60 from the outside space. That is, the cover portion 70 is positioned in the boundary region between the space inside the case 60 and the outside space. For example, the main body portion 62 and the cover portion 70 may be cast parts.

In the present embodiment, the opening portion 63 is formed at one axial end of the main body 62, namely at the left end of the main body 62 in FIG. 1. Thus, in this example, the cover portion 70 is positioned at the one axial end of the main body 62. On the other hand, as described above, the fixedly connected portion to the engine is provided at the other axial end of the case 60. Thus, in this example, the opening portion 63 and the cover portion 70 are positioned at the end of the case 60, which is located opposite to the fixedly connected portion to the engine. Accordingly, for example, in the case where the engine is provided forward of the case 60 with respect to the vehicle, the opening portion 63 and the cover portion 70 are positioned at the rear end of the case 60. For example, in the case where the engine is provided on the right side of the case 60 with respect to the vehicle, the opening portion 63 and the cover portion 70 are positioned on the left end of the ease 60. Note that the forward and rearward positions or the right and left positions in the above description may be reversed.

The cover portion 70 of the case 60 is provided with the oil pump 3. The oil pump 3 is a pump for supplying oil for lubrication and cooling to each part of the drive device 1, and is operated by torque of a rotating shaft of the driving force transfer mechanism 2. In this example, the oil pump 3 is driven by torque of an oil pump drive shaft 30 described below. As shown, in FIG. 1, the oil pump 3 is formed at a bonding portion 72 between the cover portion 70 and a pump cover 80. Note that the structures of the oil pump 3, the cover portion 70, and the pump cover 80 will be described in detail later.

The driving force transfer mechanism 2 is accommodated in the case 60. In this example, the driving force transfer mechanism 2 is a mechanism that includes a transmission member for transmitting a driving force between the engine, the two rotating electrical machines 10, 13, and wheels (not shown) in the hybrid vehicle. Examples of the transmission member include various members for transmitting rotation at the rotational speed without change or at the changed rotational speed, such as a shaft, a gear mechanism, a belt, and a chain. In the present embodiment, the driving force transfer mechanism 2 includes a differential gear mechanism (not shown) for connecting an input shaft (not shown), which is drivingly connected to an output shaft of the engine, to a rotor 11 of the rotating electrical machine 10 so that the driving force can be transmitted between the input shaft and the rotor 11. This differential gear mechanism forms an electric continuously variable speed change mechanism. Such a differential gear mechanism is preferably formed by, e.g., a planetary gear mechanism. In the present embodiment, the driving force transfer mechanism 2 includes a rotor shaft 31 and the oil pump drive shaft 30.

The oil pump drive shaft 30 is a rotating shaft for driving the oil pump 3. In the present embodiment, the oil pump drive shaft 30 is structured so as to rotate integrally with the input shaft, and the oil pump 3 is driven by the engine torque. A central axis oil passage 54 is provided in the oil pump drive shaft 30. As described in detail later, oil discharged from the oil pump 3 is supplied to the differential gear mechanism through the central axis oil passage 54 from radially inside thereof so as to lubricate the differential gear mechanism. Note that the oil flow is shown by solid arrows in FIG. 1, and also in FIGS. 2 and 3.

The rotor shaft 31 is a shaft for transmitting torque of the rotating electrical machine 10, and is structured so as to rotate integrally with the rotor 11. The rotor shaft 31 is positioned coaxially with the oil pump drive shaft 30. More specifically, the rotor shaft 31 is structured to be cylindrical shape that is hollow on a radially inner side thereof, and the oil pump drive shaft 30 is positioned radially inside the rotor shaft 31 so as to be rotatable relative to the rotor shaft 31. In the present embodiment, the rotor shaft 31 corresponds to a "rotating shaft that is positioned coaxially with an oil pump drive shaft" in the present invention.

Figure 2:
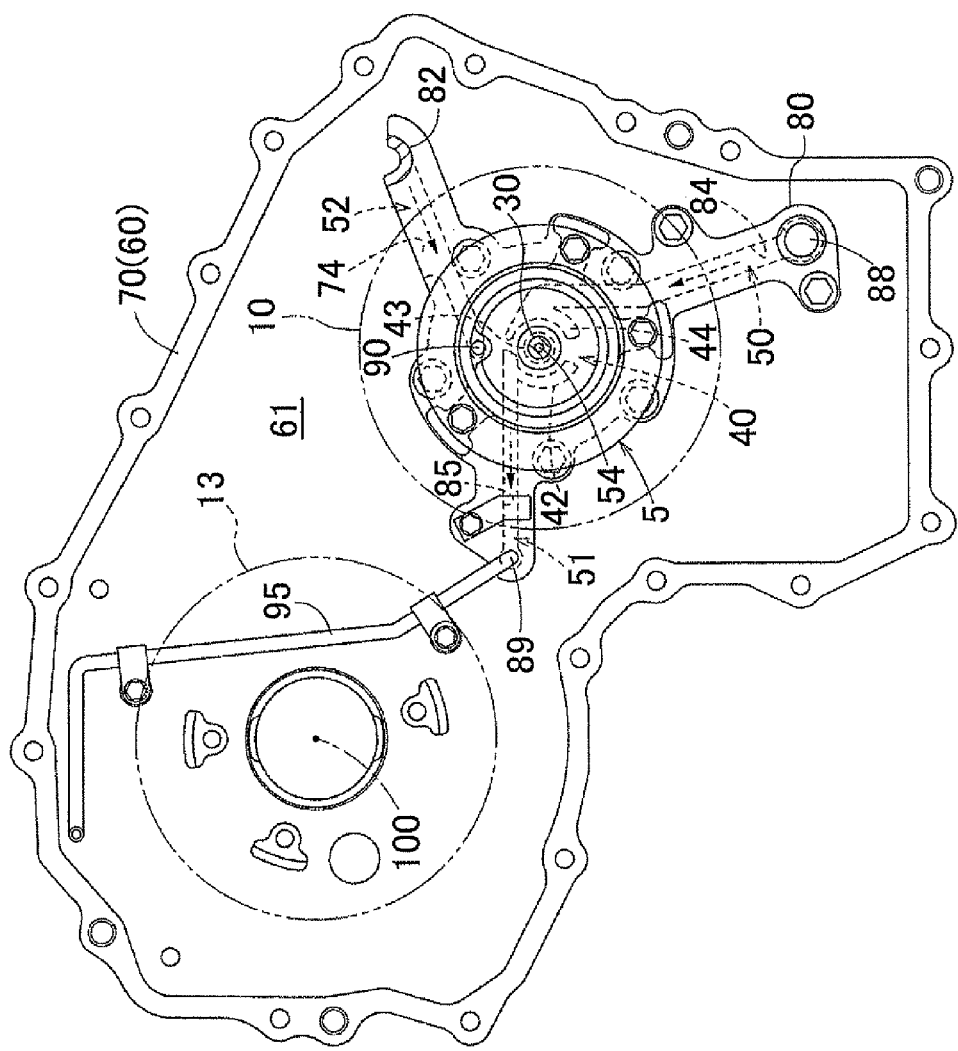
FIG. 2 is a radial cross-sectional view of the drive device according to the embodiment of the present invention.

A sensor rotor of a resolver 5 is attached to the rotor shaft 31 so as to rotate integrally with the rotor shaft 31. The resolver 5 is a sensor for detecting the rotation position (the electrical angle) and the rotational speed of the rotor 11 with respect to a stator 12 of the rotating electrical machine 10. As shown in FIGS. 1 and 2, a sensor stator of the resolver 5 is fixedly fastened to the pump cover 80 by fastening bolts.

An axial oil passage 58 and a radial oil passage 59 are provided in the rotor shaft 31. The radial oil passage 59 is an oil passage for supplying part of the oil supplied to the axial oil passage 58 to a cooling circuit formed in the rotating electrical machine 10. The rotating electrical machine 10 is cooled by the oil supplied to the cooling circuit.

In the present embodiment, the drive device 1 includes an oil reservoir 20 for storing oil that is scooped up by rotation of a rotating member (e.g., gears) of the driving force transfer mechanism 2. As shown in FIG. 1, the oil stored in the oil reservoir 20 is supplied to a relay oil passage 52 via an oil passage 57 and an oil introducing portion 82 of the pump cover 80 described below. The oil supplied to the relay oil passage 52 is supplied to a bearing 32 and the axial oil passage 58 in the rotor shaft 31 via a communication hole 90 formed in the pump cover 80.

2. Structure of Cover Portion

The structure of the cover portion 70 will be described below. As shown in FIGS. 1 and 2, the pump cover 80 is fixedly fastened to the cover portion 70 from the other axial side. Note that FIG. 2 shows a radial cross section as viewed from the connection portion between the main body portion 62 and the cover portion 70 of the case 60 toward the one axial side. For convenience of description, FIG. 2 shows only some of components. For example, the bearing 32, the sensor rotor of the resolver 5, the rotor shaft 31, and the like shown in FIG. 1 are not shown in FIG. 2. In FIG. 2, oil passages that are formed in the bonding portion 72 between the cover portion 70 and the pump cover 80 are shown by broken lines, and the outer peripheral surfaces of the rotating electrical machines 10, 13 are shown by two-dot chain lines. Note that the cover portion 70 may be, e.g., a cast part. In this case, it is preferable that processed portions (such as recesses 74 to 77, 79 described below) in the cover portion 70 be formed by casting.

Figure 3:
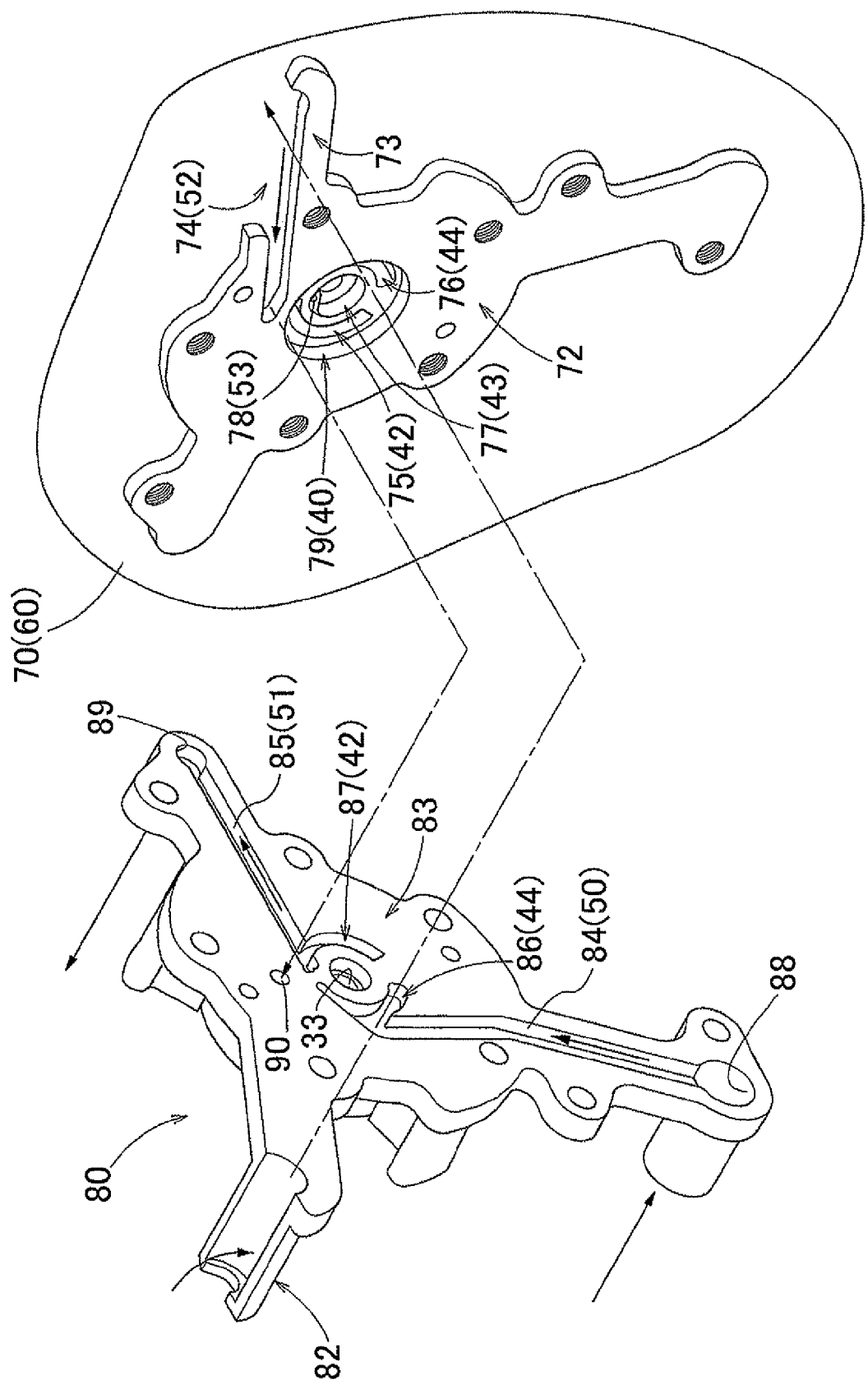
FIG. 3 is a perspective view of a bonding portion of a cover portion, and a pump cover according to the embodiment of the present invention.
Figure 4:
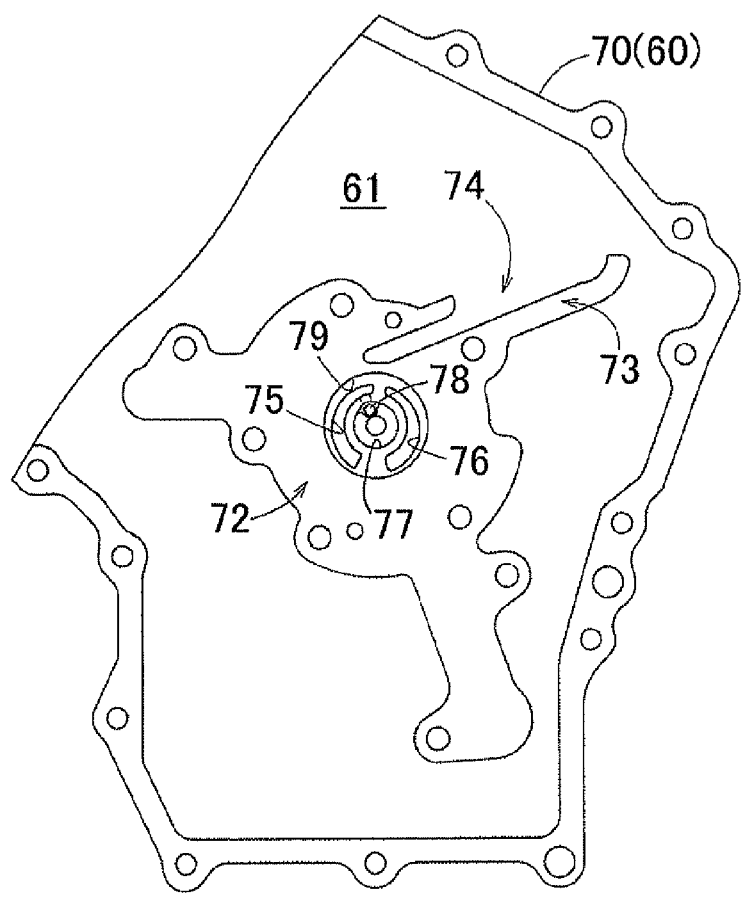
FIG. 4 is a diagram of the cover portion according to the embodiment of the present invention, as viewed from the mating surface side.

As shown in FIGS. 3 and 4, the pump chamber forming recess 79, the recess 74, and a plurality of fastening holes for attaching the pump cover 80 are formed in the mating surface of the cover portion 70. As used herein, the "mating surface of the cover portion 70" refers to the surface that is covered by the pump cover 80 in the state where the pump cover 80 is attached to the cover portion 70 (this state will be hereinafter simply referred to as the "pump cover attached state"). In other words, the mating surface of the cover portion 70 is a plane which includes a contact surface 73 (a bonding surface) that contacts the pump cover 80 in the bonding portion 72 in the pump cover attached state, and whose peripheral edge is substantially defined by the outline of the bonding portion 72 or the pump cover 80 as viewed in the direction perpendicular to this plane. That is, the mating surface of the cover portion 70 is formed by the contact surface 73 and an imaginary surface where recesses and holes are formed. The "recesses" in the mating surface of the cover portion 70 refer to portions that are located on the side away from the pump cover 80 with respect to the contact surface 73 in the pump cover attached state.

In the present embodiment, as shown in FIG. 3, the contact surface 73 is a plane that protrudes toward the other axial side with respect to the remaining part (the part other than the bonding portion 72) of the cover portion 70, which is located adjacent to the contact surface 73 in the radially outward direction. In the present example, the contact surface 73 is a smooth surface.

The recess 74 is a surface that is recessed toward the one axial side with respect to the contact surface 73. In the pump cover attached state, the recess 74, together with a contact surface 83 of the pump cover 80, forms the relay oil passage 52 described below. Note that it is also preferable that the recess 74 be a smooth surface like the contact surface 73. The axial position of the recess 74 with respect to the remaining part of the cover portion 70 is not limited as long as the recess 74 is recessed toward the one axial side with respect to the contact surface 73.

The pump chamber forming recess 79 is a recess formed in the mating surface of the cover portion 70, and a pump chamber 40 described below (see FIG. 1) is defined by the pump chamber forming recess 79 and the contact surface 83 of the pump cover 80. In this example, the pump chamber forming recess 79 is a recess having a substantially circular cross section as viewed axially.

A plurality of recesses 75 to 77 are formed in the bottom surface of the pump chamber forming recess 79. As shown in FIG. 4, the recess 75 has a substantially arc-shaped cross section as viewed axially so as to fit the shape of the pump rotor 4 (see FIG. 1) accommodated in the pump chamber 40. In the pump cover attached state, the recess 75 axially faces a recess 87 of the pump cover 80 described below, and together with the recess 87, forms a discharge chamber 42 (see FIGS. 1 and 2) that communicates with a discharge port of the oil pump 3. Thus, the recess 75 serves as a discharge recess of the cover portion 70. Note that a discharge port of the oil pump 3 is formed on both axial sides of the pump chamber 40 by the opening of the recess 75 of the cover portion 70 and the opening of the recess 87 of the pump cover 80. That is, the discharge port of the oil pump 3 is an opening that communicates with the pump chamber 40 formed by the pump chamber forming recess 79.

As shown in FIG. 4, the recess 76 has a substantially arc-shaped cross section as viewed axially so as to fit the shape of the pump rotor 4. In the pump cover attached state, the recess 76 axially faces a recess 86 of the pump cover 80 described below, and together with the recess 86, forms a suction chamber 44 (see FIGS. 1 and 2) that communicates with an suction port of the oil pump 3. Thus, the recess 76 is a suction recess of the cover portion 70. Note that the suction port of the oil pump 3 is formed on both axial sides of the pump chamber 40 by the opening of the recess 76 of the cover portion 70 and the opening of the recess 86 of the pump cover 80. That is, the suction port of the oil pump 3 is an opening that communicates with the pump chamber 40 formed by the pump chamber forming recess 79. In the present embodiment, as shown in FIG. 1, the recess 75 has a greater depth than that of the recess 76. That is, the bottom portion on one axial side of the recess 75 is positioned closer to the one axial side than the bottom portion on one axial side of the recess 76. Thus, the discharge chamber 42 has a larger capacity than that of the suction chamber 44.

As shown in FIGS. 1, 3, and 4, the recess 77 is formed so that its overall axial cross section is reduced toward the one axial side. More specifically, the recess 77 has a substantially circular cross section as viewed axially at the bottom portion of the pump chamber forming recess 79. In a portion of the recess 77 which extends from this bottom portion to a predetermined position on the one axial side, a part of a circumferential region of the recess 77 extends radially more inwards as closer to the one axial side, in a cross section as viewed axially. In a portion of the recess 77 which extends from the predetermined position to one axial end, a cross section of the recess 77 is substantially circular as viewed axially, and is axially uniform. Note that the diameter of the substantially circular cross section at the one axial end is smaller than that of the substantially circular cross section at the bottom portion. This is because the diameter of the substantially circular cross section at the one axial end of the recess 77 is a diameter of a circle that extends through a radial inner end of the part of the circumferential region which extends radially inwards. An axial end chamber 43 described below is formed by the recess 77.

A hole 78 is formed so as to connect the space (the axial end chamber 43) formed by the recess 77 to the space (the discharge chamber 42) formed by the recess 75. A communicating oil passage 53 described below is formed by the hole 78. Note that, in the present embodiment, the axial direction of the hole 78 is a direction that crosses the axial direction of the pump rotor 4. In the example of FIG. 1, the axial direction of the hole 78 crosses the axial direction of the pump rotor 4 at an angle of substantially 45 degrees.

3. Structure of Pump Cover

The structure of the pump cover 80 will be described below. As shown in FIGS. 1 and 2, the pump cover 80 is attached to the case inner surface of the cover portion 70, which forms the inner surface of the case 60, such that the pump cover 80 is accommodated in a case internal space 61 surrounded by the main body portion 62 and the cover portion 70 of the case 60. Note that the pump cover 80 may be, e.g., a cast part. In this case, it is preferable that processed portions (such as the recesses 86, 87 and recessed grooves 84, 85 described below) in the pump cover 80 be formed by casting.

Figure 5:
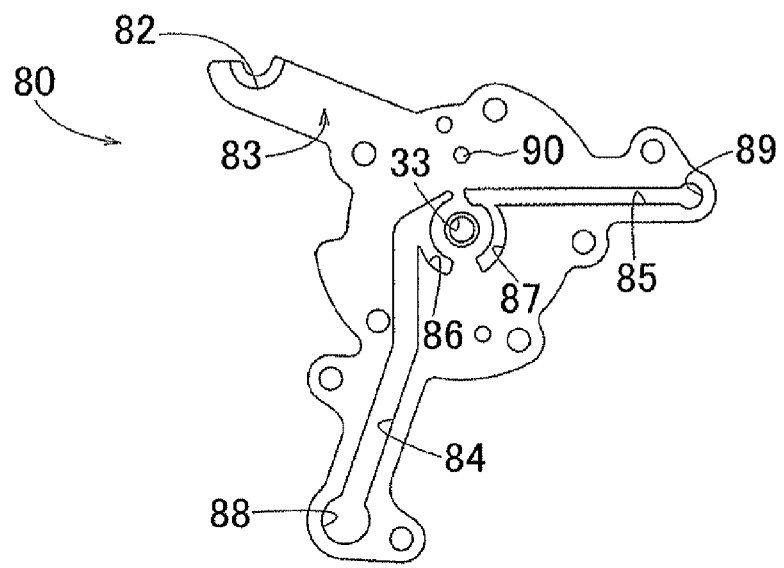
FIG. 5 is a diagram of the pump cover according to the embodiment of the present invention, as viewed from the mating surface side.

As shown in FIGS. 3 and 5, the recessed grooves 84, 85, the recesses 86, 87, oil passage connection holes 88, 89, the communication hole 90, an insertion hole 33 for inserting the oil pump drive shaft 30 therethrough, and a plurality of insertion holes for inserting fastening bolts are formed in the mating surface of the pump cover 80. As used herein, the mating surface of the pump cover 80 refers to a surface that contacts the cover portion 70 in the pump cover attached state. In other words, the mating surface of the pump cover 80 refers to a plane that includes the contact surface 83 (the bonding surface), which contacts the cover portion 70 in the bonding portion 72 in the pump cover attached state, and whose peripheral edge is substantially defined by the outline of the pump cover 80 as viewed in the direction perpendicular to this plane. That is, the mating surface of the pump cover 80 is formed by the contact surface 83 and an imaginary surface where recessed grooves, recesses, and holes are formed. Although detailed description is omitted, as shown in FIGS. 1 and 2, the pump cover 80 is fixedly fastened to the cover portion 70 by fastening bolts. The "recesses" in the mating surface of the pump cover 80 refer to portions that are located on the side away from the cover portion 70 with respect to the contact surface 83 in the pump cover attached state.

In the present embodiment, as shown in FIG. 3, the contact surface 83 is a smooth surface. Thus, in the present embodiment, the cover portion 70 and the pump cover 80 are bonded together such that the smooth, contact surface 73 provided in the mating surface of the cover portion 70 contacts the smooth contact surface 83 provided in the mating surface of the pump cover 80. Thus, a certain level of fluid-tightness can be obtained by merely fixing the cover portion 70 to the pump cover 80 in contact with each other without using any sealing member.

The recessed groove 84 is a groove-like recess formed along the radial direction. In the pump cover attached state, the recessed groove 84, together with the contact surface 73 of the cover portion 70, forms a suction oil passage 50 described below. In the present example, the recessed groove 84 has a substantially rectangular cross section, as taken along the direction perpendicular to the extending direction of the recessed groove 84.

Then, the recess 86 and the oil passage connection hole 88 are formed so as to communicate with the recessed groove 84. As shown in FIG. 5, the recess 86 has a substantially arc-shaped cross section as viewed axially so as to fit the shape of the pump rotor 4. As described above, the recess 86, together with the recess 76 of the cover portion 70, forms the suction chamber 44. Thus, the recess 86 serves a suction recess of the pump cover 80. As shown in FIG. 1, the oil passage connection hole 88 forms a connection portion for connecting an oil passage pipe 96. In this example, the oil passage connection hole 88 is an axial hole.

The recessed groove 85 is a groove-like recess formed along the radial direction. In the pump cover attached state, the recessed groove 85, together with the contact surface 73 of the cover portion 70, forms a radial discharge oil passage 51 described below. In this example, the recessed groove 85 has a substantially rectangular cross section, as taken along the direction perpendicular to the extending direction of the recessed groove 85.

The recess 87 and the oil passage connection hole 89 are formed so as to communicate with the recessed groove 85. As shown in FIG. 5, the recess 87 has a substantially arc-shaped cross section as viewed axially so as to fit the shape of the pump rotor 4. As described above, the recess 87, together with the recess 75 of the cover portion 70, forms the discharge chamber 42. Thus, the recess 87 is a discharge recess of the pump cover 80. The oil passage connecting hole 89 forms a connection portion for connecting an oil passage pipe 95 shown in FIG. 2. In this example, the oil passage connecting hole 89 is an axial hole.

The communication hole 90 is a hole for connecting the relay oil passage 52 to the axial oil passage 58 in the rotor shaft 31. In this example, the communication hole 90 is an axial hole.

In the present embodiment, as shown in FIG. 1, the rotor shaft 31 is supported by the pump cover 80 via the bearing 32. The pump cover 80 is fixedly fastened to the cover portion 70 of the case 60. Thus, in the present example, the rotor shaft 31 is rotatably supported by the case 60 via the bearing 32 and the pump cover 80. This structure enables the pump cover 80 to be positioned between the cover portion 70 and the rotor shaft 31, and enables oil supplied to the relay oil passage 52 to be supplied to the bearing 32 and the axial oil passage 58 in the rotor shaft 31 via the communication hole 90.

The pump cover 80 includes the trough-like oil introducing portion 82 for guiding oil, which is scooped up by rotation of the rotating member of the driving force transfer mechanism 2, to the relay oil passage 52. As described above, the oil scooped up by rotation of the rotating member of the driving force transfer mechanism 2 is stored in the oil reservoir 20, and drops vertically downward from a hole formed at the end of the oil passage 57. Thus, the trough-shaped oil introducing portion 82 as shown in FIG. 3 is provided under (vertically under) the hole in order to receive the oil dropping from the hole. Note that since the pump cover 80 has such an oil introducing portion 82, the pump cover 80 and the oil introducing portion 82 can be formed by the same part, thereby suppressing an increase in the number of parts caused by providing the oil introducing portion 82. Note that in the case where the pump cover 80 is a cast part, it is preferable that the oil introducing portion 82 be formed integrally with the pump cover 80 by casting.

4. Structure of Oil Pump

The structure of the oil pump 3 will be described below. As shown in FIG. 1, the oil pump 3 includes the pump rotor 4 in the pump chamber 40. The pump rotor 4 is positioned coaxially with the oil pump drive shaft 30, and is driven by the oil pump drive shaft 30. In this example, the oil pump 3 is an internal gear pump, and both an inner rotor and an outer rotor of the pump rotor 4 are accommodated in the pump chamber 40, and the inner rotor is fixed to the oil pump drive shaft 30. Note that the structure of the oil pump 3 is not limited to this, and the type of the pump may also be preferably an external gear pump, a vane pump, or the like.

As shown in FIGS. 1 and 2, the oil pump 3 is structured to suck oil from the suction chamber 44 to the pump chamber 40 via the suction port to generate an oil pressure, and to discharge oil to the discharge chamber 42 via the discharge port. As described above, the suction port is formed by the opening of the recess 76 of the cover portion 70 and the opening of the recess 86 of the pump cover 80, which axially face each other in the pump cover attached state. The suction port functions to connect the suction chamber 44 and the suction oil passage 50 to the pump chamber 40. The discharge port is formed by the opening of the recess 75 of the cover portion 70 and the opening of the recess 87 of the pump cover 80, which axially face each other in the pump cover attached state. The discharge port functions to connect the radial discharge oil passage 51 and the central axis oil passage 54 to the pump chamber 40 via the discharge chamber 42.

The pump chamber 40 is formed by a recess provided in at least one of the mating surface of the cover portion 70 and the mating surface of the pump cover 80 in the bonding portion 72 between the cover portion 70 and the pump cover 80. In the present embodiment, as described above, the pump chamber forming recess 79 is formed in the mating surface of the cover portion 70, and the pump chamber forming recess 79 and the contact surface 83 of the pump cover 80 form the pump chamber 40. As shown in FIG. 1, the present embodiment uses the structure in which the cover portion 70 and the pump cover 80 are fixedly fastened together so as to be merely in contact with each other, without using any sealing member such as an O-ring.

As described above, the pump cover 80, which forms the pump chamber 40, is attached to the case inner surface of the cover portion 70 so as to be accommodated in the case internal space 61. Thus, the pump chamber 40 formed as described above is a space contained in the case internal space 61. Accordingly, even if oil leaks out of the pump chamber 40, the oil merely drops into the case internal space 61. Note that the driving force transfer mechanism 2, which is lubricated and cooled by oil, is accommodated in the case internal space 61. Thus, oil leakage into the case internal space 61 is allowed.

As described above, forming the pump chamber 40 based on the present invention can reduce the level of fluid-tightness that is required for bonding between the cover portion 70 and the pump cover 80. As described above, this enables the pump chamber 40 to be formed without using any sealing member, thereby suppressing an increase in the number of parts, and reducing the complication of the manufacturing process.

Moreover, in the present embodiment, the oil pump 3 is structured so as to generate an oil pressure required to both lubricate and cool the driving force transfer mechanism 2. In general, the oil pressure required to lubricate and cool the driving force transfer mechanism 2 is lower than that required to engage clutches and brakes in an automatic speed change mechanism. Thus, if the oil pump 3 is used for lubrication or cooling, the pressure applied to the pump chamber 40 is reduced. That is, in the present embodiment, the level of fluid-tightness required for bonding between the cover portion 70 and the pump cover 80 is reduced in this regard as well.

Note that, as described above, in the present embodiment, both the contact surface 73 provided in the mating surface of the cover portion 70 and the contact surface 83 provided in the mating surface of the pump cover 80 are smooth surfaces. That is, the cover portion 70 and the pump cover 80 are bonded together such that the smooth contact surface 73 provided in the mating surface of the cover portion 70 contacts the smooth contact surface 83 provided in the mating surface of the pump cover 80. Thus, a certain level of fluid-tightness can be obtained by merely fixing the cover portion 70 and the pump cover 80 in contact with each other.

Since the present embodiment uses the structure in which the pump chamber 40 is formed by the cover portion 70 that is detachable from the main body portion 62 of the case 60, and the pump cover 80 that is attached to the cover portion 70. This simplifies assembly and maintenance of the oil pump.

5. Structure of Oil Passages

The structure of oil passages of the drive device 1 will be described below. The drive device 1 of the present embodiment includes the suction oil passage 50 as a suction-side oil passage, and includes the radial discharge oil passage 51 and the central axis oil passage 54 as discharge-side oil passages.

The suction oil passage 50 is an oil passage for guiding oil from an oil supply source to the pump chamber 40. For example, in the case where the drive device 1 is structured so that oil is stored in the lower part of the case 60 after circulating each part of the drive device 1, the lower part of the case 60 serves as the oil supply source. In the present embodiment, as shown in FIG. 1, one end of the suction oil passage 50 communicates with an oil passage provided in the oil passage pipe 96 that connects to a strainer 21 via the oil passage connection hole 88. The oil pump 3 sucks oil from the oil supply source via the oil passage in the oil passage pipe 96, and the suction oil passage 50.

In the present embodiment, as shown in FIGS. 1 to 3, the suction oil passage 50 is formed by the recessed groove 84 provided in the mating surface of the pump cover 80, and the mating surface (the contact surface 73) of the cover portion 70. More specifically, in the pump cover attached state, the opening portion on the cover portion 70 side of the recessed groove 84 of the pump cover 80 is closed by the contact surface 73 of the cover portion 70, whereby the suction oil passage 50 is formed along the mating surface. Since the recessed groove 84 of the pump cover 80 communicates with the oil passage connection hole 88, oil supplied to the oil passage connection hole 88 flows through the suction oil passage 50. Since the recessed groove 84 of the pump cover 80 communicates with the recess 86 that defines the suction chamber 44, oil flowing through the suction oil passage 50 is supplied to the suction port via the suction chamber 44.

As shown in FIG. 2, oil is supplied from the oil passage connection hole 88, which is provided radially outside with respect to the pump chamber 40, to the suction oil passage 50. According to such a positional relation between the pump chamber 40 and the oil passage connection hole 88, as shown in FIG. 2, an oil passage formed substantially linearly along the radial direction is used as the suction oil passage 50 in the present embodiment, whereby the length of the suction oil passage 50 is reduced.

The radial discharge oil passage 51 is an oil passage for supplying oil discharged from the oil pump 2 to each part of the drive device 1. More specifically, as shown in FIG. 2, one end of the radial discharge oil passage 51 communicates with an oil passage in the oil passage pipe 95 via the oil passage connection hole 89. In the present embodiment, as shown in FIG. 2, the oil passage pipe 95 is shaped so as to supply oil toward a position above the axial center of the pump rotor 4 in FIG. 2. The rotating electrical machine 13, which is different from the rotating electrical machine 10, is positioned about an axis 100, and at least part of oil supplied to the oil passage pipe 95 is used to cool the rotating electrical machine 13.

In the present embodiment, as shown in FIGS. 2 and 3, the radial discharge oil passage 51 is formed by the recessed groove 85 provided in the mating surface of the pump cover 80, and the mating surface (the contact surface 73) of the cover portion 70. More specifically, in the pump cover attached state, the opening portion on the cover portion 70 side of the recessed groove 85 of the pump cover 80 is closed by the contact surface 73 of the cover portion 70, whereby the radial discharge oil passage 51 is formed along the mating surface. Since the recessed groove 85 of the pump cover 80 communicates with the recess 87 that defines the discharge chamber 42, oil discharged from the pump chamber 40 to the discharge port is supplied to the radial discharge oil passage 51 via the discharge chamber 42. Since the recessed groove 85 of the pump cover 80 communicates with the oil passage connection hole 89, oil flowing through the radial discharge oil passage 51 is supplied to the oil passage in the oil passage pipe 95 via the oil passage connection hole 89.

As shown in FIGS. 2 and 3, the oil passage connection hole 89, which forms the connection portion between the radial discharge oil passage 51 and the oil passage in the oil passage pipe 95, is provided radially outside with respect to the pump chamber 40. According to such a positional relation between the pump chamber 40 and the oil passage connection hole 89, as shown in FIG. 2, an oil passage formed substantially linearly along the radial direction is used as the'radial discharge oil passage 51 in the present embodiment, whereby the length of the radial discharge oil passage 51 is reduced. In this example, the radial discharge oil passage 51 is structured to extend along the lateral direction in FIG. 2. Note that the lateral direction in FIG. 2 corresponds to the horizontal direction in the state in which the drive device 1 is mounted on the hybrid vehicle. Thus, the radial discharge oil passage 51 extends horizontally in this example.

As described above, in the present embodiment, both the suction oil passage 50 and the radial discharge oil passage 51 are formed by the recessed grooves provided in at least one of the mating surface of the cover portion 70 and the mating surface of the pump cover 80 (in this example, the mating surface of the pump cover 80), and are formed along the radial direction of the pump rotor 4. That is, in the present embodiment, the radial discharge oil passage 51 corresponds to a "discharge oil passage formed by a recessed groove provided in at least one of the mating surface of the cover portion and the mating surface of the pump cover" in the present invention.

As described above, the oil passage connection hole 88 of the connection portion for supplying oil to the suction oil passage 50, and the oil passage connection hole 89 of the connection portion for discharging oil from the radial discharge oil passage 51 are formed by holes formed in the pump cover 80. That is, the suction oil passage 50 and the radial discharge oil passage 51, which communicate with the pump chamber 40, are formed by recessed grooves formed in at least one of the mating surface of the cover portion 70 and the mating surface of the pump cover 80, whereby these connection portions can be provided by merely processing only the pump cover 80. These connection portions are formed in the case internal space 61 described above. Thus, even if oil leaks through the connection portions, the oil only drops in the case internal space 61. This can simplify the seal structure in the connection portions described above. Note that, as shown in FIG. 1, the present example shows the case where an O-ring is used as a sealing member at the connection portion between the oil passage connection hole 88 and the oil passage pipe 96.

Like the radial discharge oil passage H, the central axis oil passage 54 is an oil passage for supplying oil, which is discharged from the oil pump 3, to each part of the drive device 1. That is, in the present embodiment, the central axis oil passage 54 is also a discharge oil passage in the sense that it is a path through which oil discharged from the oil pump 3 flows. However, the central axis oil passage 54 is not formed by a recessed groove that is provided at least one of the mating surface of the cover portion 70 and the mating surface of the pump cover 80.

More specifically, oil is supplied from the discharge port to the central axis oil passage 54 via the discharge chamber 42, the communicating oil passage 53, and the axial end chamber 43. As described above, the discharge chamber 42 is formed by the recess 75 provided in the cover portion 70, so as to communicate with the discharge port. As described above, the communicating oil passage 53 is formed by the hole 78 formed in the cover portion 70, and connects the discharge chamber 42 to the axial end chamber 43. The axial end chamber 43 is formed by the recess 77 provided in the cover portion 70, and is structured so as to communicate with an axial end 55, which is one axial end of the central axis oil passage 54. That is, the discharge chamber 42, the communicating oil passage 53, and the axial end chamber 43 are formed in the case inner surface of the cover portion 70 so as to communicate with each other, whereby oil can be appropriately supplied to the central axis oil passage 54 from the discharge port through the discharge chamber 42, the communicating oil passage 53, and the axial end chamber 43.

In the present embodiment, oil supplied to the central axis oil passage 54 flows toward the other axial end, so that the oil can be supplied via oil passages (not shown) from radially inside to, e.g., the differential gear mechanism which connects the input shaft and the rotor 11 of the rotating electrical machine 10 so that a driving force can be transmitted therebetween. Accordingly, for example, even if there are parts to which oil cannot be easily supplied from radially outside, oil can be appropriately supplied to these parts.

The relay oil passage 52 is an oil passage through which oil for both lubricating and cooling the driving force transfer mechanism 2 flows. In the present embodiment, the relay oil passage 52 is formed by the recess 74 provided in the mating surface of the cover portion 70, and the mating surface (the contact surface 83) of the pump cover 80. As shown in FIG. 3, the recess 74 of the cover portion 70 is a surface that is recessed toward the one axial side with respect to the contact surface 73. Thus, the boundaries on both axial sides of the relay oil passage 52 are defined by the recess 74 and the contact surface 83 of the pump cover 80. As described above, oil is supplied from the oil reservoir 20 to the relay oil passage 52 via the oil introducing portion 82 of the pump cover 80. The oil supplied to the relay oil passage 52 is supplied to the bearing 32 via the through hole 90 formed in the pump cover 80, and is also supplied to the axial oil passage 58 in the rotor shaft 31. The oil supplied to the axial oil passage 58 is used to cool the rotating electrical machine 10, and to lubricate and cool each part of the driving force transfer mechanism 2.

Note that oil flowing through the relay oil passage 52 flows toward the through hole 90 of the pump cover 80 by gravity. This will be described with reference to FIG. 2. Note that the up-down direction in FIG. 2 substantially corresponds to the up-down direction (the vertical direction) in the state in which the drive device 1 is mounted on the vehicle. As shown in FIG. 2, the oil introducing portion 82 is located above (vertically above) the through hole 90, and the relay oil passage 52 is formed so as to linearly connect the oil introducing portion 82 to the through hole 90. This enables oil supplied to the oil introducing portion 82 to be supplied to the through hole 90 by using gravity.

As described above, in the present embodiment, all of the suction oil passage 50, the radial discharge oil passage 51, and the relay oil passage 52 are formed by recesses formed in one of the mating surface of the pump cover 80 and the mating surface of the cover portion 70. This structure can reduce the complication of the manufacturing process, as compared to the case where these oil passages are formed by drilling. Although forming radial oil passages in the cover portion 70 by drilling can decrease the pressure resistance of the cover portion 70, the above structure of the present embodiment can suppress such a decrease in pressure resistance.

6. Other Embodiments (1) The above embodiment is described with respect to an example in which the pump chamber 40 is formed by the pump chamber forming recess 79 provided in the mating surface of the cover portion 70. However, embodiments of the present invention are not limited to this. For example, it is also one of preferred embodiments of the present invention to form the pump chamber 40 by a recess provided in the mating surface of the pump cover 80 in the bonding portion 72, or by recesses provided in both the mating surface of the cover portion 70 and the mating surface of the pump cover 80 in the bonding portion 72.

(2) The above embodiment is described, with respect to an example in which both the suction oil passage 50 and the radial discharge oil passage 51 are formed by the recessed grooves 84, 85 provided in the mating surface of the pump cover 80. However, embodiments of the present invention are not limited to this. For example, it is also preferable that both the suction oil passage 50 and the radial discharge oil passage 51 be formed by recessed grooves provided in the mating surface of the cover portion 70, or by recessed grooves provided in both the mating surface of the cover portion 70 and the mating surface of the pump cover 80. It should be understood that the recessed groove of the suction oil passage 50 and the recessed groove of the radial discharge oil passage 51 may be formed by different members from each other. Alternatively, at least one of the suction oil passage 50 and the radial discharge oil passage 51 may be formed by, e.g., a hole formed in the cover portion 70 or the pump cover 80, an oil passage pipe, or the like, rather than by a recessed groove formed in the mating surface. It is also preferable that the drive device 1 do not include the radial discharge oil passage 51, and oil discharged from the pump chamber 40 be supplied only to the central axis oil passage 54.

(3) The above embodiment is described with respect to an example in which both the suction oil passage 50 and the radial discharge oil passage 51 are formed substantially linearly along the radial direction of the pump rotor 4. However, embodiments of the present invention are not limited to this. For example, it is also preferable that at least one of the suction oil passage 50 and the radial discharge oil passage 51 be formed along a direction that crosses the radial direction of the pump rotor 4. Note that, for example, the direction that crosses the radial direction of the pump rotor 4 can be a direction along the axial or circumferential direction of the pump rotor 4, or a direction determined by two or three of the radial, axial, and circumferential directions. It is also preferable that at least one of the suction oil passage 50 and the radial discharge oil passage 51 be formed in a curved shape rather than a linear shape.

(4) The above embodiment is described with respect to an example in which the recessed grooves 84, 85, which form the suction oil passage 50 and the radial discharge oil passage 51, have a substantially rectangular cross section, as taken along the direction perpendicular to the extending direction of the grooves 84, 85. However, embodiments of the present invention are not limited to this. For example, it is also preferable that the recessed grooves 84, 85 be formed so as to have a substantially semicircular or triangular cross section, as taken along the direction perpendicular to the extending direction of the recessed grooves 84, 85.

(5) The above embodiment is described with respect to an example in which the cover portion 70 and the pump cover 80 are bonded together such that the smooth contact surface 73 provided in the mating surface of the cover portion 70 contacts the smooth contact surface 83 provided in the mating surface of the pump cover 80. However, embodiments of the present invention are not limited to this. The above embodiment is described with respect to an example in which the cover portion 70 and the pump cover 80 are fixedly fastened together so as to be merely in contact with each other, without using any sealing member such as an O-ring. However, it is preferable to fixedly fasten the cover portion 70 and the pump cover 80 together via a sealing member, as needed.

(6) The above embodiment is described with respect to an example in which the relay oil passage 52 is formed by the recess 74 provided in the cover portion 70. However, embodiments of the present invention are not limited to this. For example, it is also preferable that the relay oil passage 52 be formed by a recess provided in the pump cover 80, or be formed by recesses provided in both the mating surface of the cover portion 70 and the mating surface of the pump cover 80. The above embodiment is described with respect to an example in which the relay oil passage 52 is an oil passage through which oil for both lubricating and cooling the driving force transfer mechanism 2 flows. However, it is also preferable that the relay oil passage 52 be an oil passage through which oil for either lubricating or cooling the driving force transfer mechanism 2 flows. The drive device 1 may not include the relay oil passage 52.

(7) The above embodiment is described with respect to an example in which the pump cover 80 includes the trough-shaped oil introducing portion 82 for guiding oil, which is scooped up by rotation of the rotating member of the driving force transfer mechanism 2, to the relay oil passage 52. However, embodiments of the present invention are not limited to this. For example, it is also preferable that the pump cover 80 do not include the oil introducing portion 82, and oil be supplied from the oil passage 57 directly to the relay oil passage 52. The oil introducing portion 82 may be formed by a part different from the pump cover 80.

(8) The above embodiment is described with respect to an example in which the rotor shaft 31 is supported by the pump cover 80 via the bearing 32. However, embodiments of the present invention are not limited to this. For example, it is also one of preferred embodiments of the present invention that the rotor shaft 31 be supported directly by the case 60 via a bearing. The rotor shaft 31 may not be positioned coaxially with the oil pump drive shaft 30.

(9) The above embodiment is described with respect to an example in which the discharge chamber 42, the communicating oil passage 53, and the axial end chamber 43 be formed in the case inner surface of the cover portion 70. However, embodiments of the present invention are not limited to this. For example, it is also one of preferred embodiments of the present invention that either of or any of the discharge chamber 42, the communicating oil passage 53, and the axial end chamber 43 is not provided in the case inner surface of the cover portion 70. In this case, oil may be supplied to the central axis oil passage 54 via other oil passage and other chamber, or the oil pump drive shaft 30 may not include the central axis oil passage 54.

(10) The above embodiment is described with respect to an example in which the cover portion 70 is structured so as to entirely cover and close the opening portion 63 of the main body portion 62. However, embodiments of the present invention are not limited to this. It is also preferable that the cover portion 70 only partially cover the opening portion 63 of the main body portion 62.

(11) The above embodiment is described with respect to an example in which the opening portion 63 to which the cover portion 70 is attached is formed at the axial end of the main body portion 62. However, the position of the opening portion 63 is not limited to this. For example, it is also one of preferred embodiments of the present invention that the main body portion 62 have an intermediate wall located between both axial ends of the main body portion 62, and the opening portion 63 to which the cover portion 70 is attached be formed in the intermediate wall. It is also preferable that the opening portion 63 be formed at an end located in a direction crossing the axial direction, rather than at the axial end. For example, it is preferable that the opening portion 63 be positioned at a vertical upper end or a vertical lower end in the state in which the drive device 1 is mounted on the vehicle. It should be understood that the axial direction of the pump rotor 4 may be substantially parallel to the horizontal direction, or may be a direction crossing the horizontal direction, such as the vertical direction, in the state in which the drive device 1 is mounted on the vehicle.

(12) The above embodiment is described with respect to an example in which the oil pump drive shaft 30 is structured so as to rotate integrally with the input shaft. However, embodiments of the present invention are not limited to this. It is also preferable that the oil pump drive shaft 30 be structured so as to rotate integrally with other shafts of the driving force transfer mechanism 2, such as the rotor shaft 31.

(13) The above embodiment is described with respect to an example in which the oil pump 3 is structured so as to generate an oil pressure required to both lubricate and cool the driving force transfer mechanism 2. However, embodiments of the present invention are not limited to this. For example, it is also one of preferred embodiments of the present invention that the oil pump 3 be structured so as to generate an oil pressure required to either lubricate or cool the driving force transfer mechanism 2. In the case where the drive device 1 includes an automatic speed change mechanism (a multi-stage speed change mechanism or a continuously variable speed change mechanism) in the case 60, it is also preferable that the oil pump 3 be structured so as to generate an oil pressure required to engage clutches and brakes of the automatic speed change mechanism.

(14) The above embodiment is described, with respect to an example in which the two rotating electrical machines 10, 13 are provided in the case 60, and the two rotating electrical machines 10, 13 are not positioned coaxially with each other. However, embodiments of the present invention are not limited to this. It is also preferable that the two rotating electrical machines 10, 13 be positioned coaxially with each other. It is also preferable that only one rotating electrical machine, or three or more rotating electrical machines be provided instead of two rotating electrical machines.

(15) The above embodiment is described with respect to an example in which the drive device 1 is a drive device for hybrid vehicles. However, embodiments of the present invention are not limited to this. For example, it is also preferable that the drive device 1 be a drive device for electric vehicles having no engine as a driving power source. It is also preferable that the drive device 1 be a drive device for vehicles having only an engine as a driving power source. In this case, no rotating electrical machine is provided in the case 60, and the driving force transfer mechanism 2 (such as a speed change mechanism) is a main part that is accommodated in the case 60. In any case, an output differential gear unit for distributing the driving force of the engine and the rotating electrical machines to a plurality of wheels may be provided integrally in the case 60, or may be provided in a case different from the case 60. The drive device 1 is not limited to drive devices for vehicles, and the present invention may be applied to various drive devices having a driving force transfer mechanism in a case.

The present invention can be preferably used in drive devices in which a driving force transfer mechanism is accommodated in a case that includes a main body portion having an opening portion, and a cover portion attached to the opening portion, and an oil pump is provided in the cover portion.

What is claimed is:

1. A drive device in which a driving force transfer mechanism is accommodated in a case that includes a main body portion having an opening portion and a cover portion attached to the opening portion configured so as to entirely cover and close the opening portion, and the cover portion is provided with an oil pump, the drive device comprising:

a pump cover attached to an inner surface of the cover portion, which forms an inner surface of the case, such that the pump cover is accommodated in an internal space surrounded by the main body portion and the cover portion, wherein a pump chamber of the oil pump is formed by a recess that is formed in at least one of a mating surface of the cover portion and a mating surface of the pump cover in a bonding portion between the cover portion and the pump cover;

a hollow cylindrical rotating shaft that forms the driving force transfer mechanism configured to be supported by the pump cover via a bearing;

an oil pump drive shaft configured to drive the oil pump, the oil pump drive shaft being oriented coaxial and radially inward of the rotating shaft and configured to rotate relative to the rotating shaft;

an axial oil passage, formed radially inward of the rotating shaft and radially outward of the oil pump drive shaft;

a relay oil passage through which oil for either lubricating or cooling the drive force transfer mechanism or oil for both lubricating and cooling the drive force transfer mechanism flows, is formed by a recess provided in at least one of the matching surface of the cover portion and the matching surface of the pump cover; and a communication hole configured to communicate between the relay oil passage and the axial oil passage, the communication hole being provided in the pump cover, and oil supplied to the relay oil passage is supplied to the bearing and the axial oil passage via the communication hole.

2. The drive device according to claim 1, wherein
at least one of a suction oil passage and a discharge oil passage of the oil pump is formed by a recessed groove provided at least in one of the mating surface of the cover portion and the mating surface of the pump cover.

3. The drive device according to claim 1, wherein
the cover portion and the pump cover contact each other on smooth contact surfaces respectively provided in the mating surface of the cover portion and the mating surface of the pump cover.

4. The drive device according to claim 1, wherein
the pump cover includes a trough-shaped oil introducing portion for guiding oil, which is scooped up by rotation of a rotating member of the driving force transfer mechanism, to the relay oil passage.

5. The drive device according to claim 1, wherein
a discharge chamber that communicates with a discharge port of the oil pump, an axial end chamber that communicates with an axial end of a central axis oil passage provided in the oil pump drive shaft for driving the oil pump, and a communicating oil passage that connects the discharge chamber to the axial end chamber, are formed in the case inner surface of the cover portion.

6. The drive device according to claim 2, wherein
the oil pump includes a pump rotor in the pump chamber, the pump rotor is positioned coaxially with an oil pump drive shaft, and is driven by the oil pump drive shaft, and
at least one of the suction oil passage and the discharge oil passage is formed along a radial direction of the pump rotor.

7. The drive device according to claim 1, wherein
the oil pump generates an oil pressure required to either lubricate or cool the driving force transfer mechanism, or an oil pressure required to both lubricate and cool the driving force transfer mechanism.

8. The drive device according to claim 2, wherein the cover portion and the pump cover contact each other on smooth contact surfaces respectively provided in the mating surface of the cover portion and the mating surface of the pump cover.

9. The drive device according to claim 8, wherein the pump cover includes a trough-shaped oil introducing portion for guiding oil, which is scooped up by rotation of a rotating member of the driving force transfer mechanism, to the relay oil passage.

10. The drive device according to claim 1, wherein a discharge chamber that communicates with a discharge port of the oil pump, an axial end chamber that communicates with an axial end of a central axis oil passage provided in the oil pump drive shaft for driving the oil pump, and a communicating oil passage that connects the discharge chamber to the axial end chamber, are formed in the case inner surface of the cover portion.

11. The drive device according to claim 10, wherein the oil pump generates an oil pressure required to either lubricate or cool the driving force transfer mechanism, or an oil pressure required to both lubricate and cool the driving force transfer mechanism.

12. The drive device according to claim 2, wherein the pump cover includes a trough-shaped oil introducing portion for guiding oil, which is scooped up by rotation of a rotating member of the driving force transfer mechanism, to the relay oil passage.

13. The drive device according to claim 2, wherein a discharge chamber that communicates with a discharge port of the oil pump, an axial end chamber that communicates with an axial end of a central axis oil passage provided in the oil pump drive shaft for driving the oil pump, and a communicating oil passage that connects the discharge chamber to the axial end chamber, are formed in the case inner surface of the cover portion.

14. The drive device according to claim 3, wherein the pump cover includes a trough-shaped oil introducing portion for guiding oil, which is scooped up by rotation of a rotating member of the driving force transfer mechanism, to the relay oil passage.

15. The drive device according to claim 3, wherein a discharge chamber that communicates with a discharge port of the oil pump, an axial end chamber that communicates with an axial end of a central axis oil passage provided in the oil pump drive shaft for driving the oil pump, and a communicating oil passage that connects the discharge chamber to the axial end chamber, are formed in the case inner surface of the cover portion.

* * * * *